G. S. MEPSTEAD.
FRICTION DRIVING GEAR FOR MOTOR VEHICLES.
APPLICATION FILED JAN. 3, 1921.

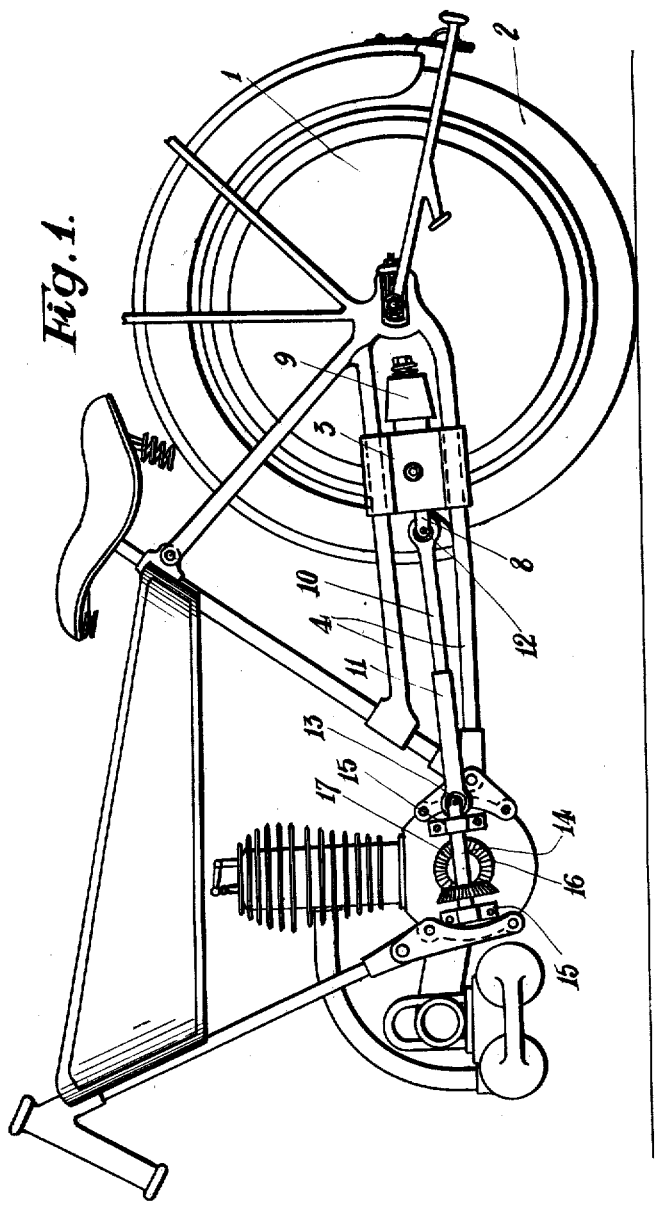
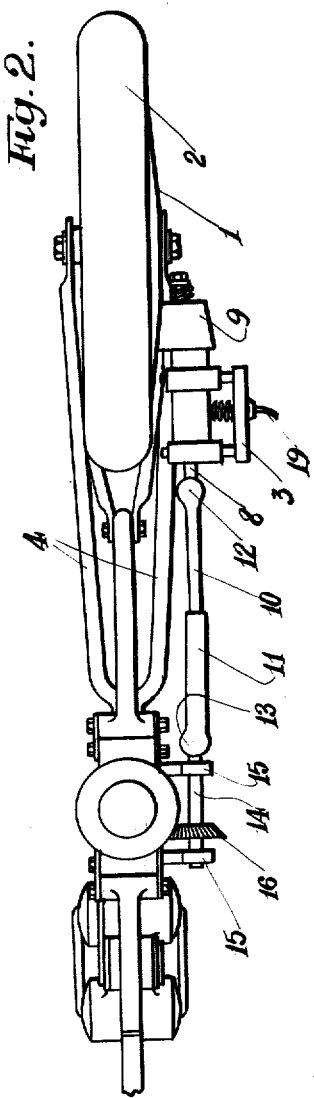

1,424,581.

Patented Aug. 1, 1922.

INVENTOR.
GEORGE SIDNEY MEPSTEAD.
PER:- Rayner & Co.
ATTORNEYS.

UNITED STATES PATENT OFFICE.

GEORGE SIDNEY MEPSTEAD, OF MORTLAKE, LONDON, ENGLAND.

FRICTION DRIVING GEAR FOR MOTOR VEHICLES.

1,424,581. Specification of Letters Patent. Patented Aug. 1, 1922.

Application filed January 3, 1921. Serial No. 434,715.

*To all whom it may concern:*

Be it known that I, GEORGE SIDNEY MEPSTEAD, subject of the King of Great Britain and Ireland, residing at 26 Second Avenue, Mortlake, in the county of London, England, have invented certain new and useful Improvements in Friction Driving Gears for Motor Vehicles, of which the following is a specification.

This invention relates to apparatus for the transmission of power from the engine to the road wheel or wheels of motor vehicles and particularly to motor-cycles.

According to this invention I provide a suitably shaped conical friction disc mounted upon the wheel or wheels to be driven. Upon suitable guides on the vehicle frame arranged parallel to the face of the friction disc upon the driven wheel, is mounted a suitable slidable carriage adapted to carry the driving wheel. The driving wheel is conical in form and mounted upon a suitable short shaft adapted to rotate in bearings in a bracket supported upon the slidable carriage.

The axis of the shaft and the conical friction wheel is arranged substantially at right angles to the axis of the conical friction plate upon the wheel to be driven, and the bracket is slidably supported upon the carriage and acted upon by suitable springs which force it in a lateral direction so as to press the friction wheel into contact with the friction disc.

A suitable telescopic shaft connects the end of the shaft carrying the friction wheel to a short shaft adapted to be driven by the engine of the motor vehicle, either direct or through any suitable gearing. The telescopic shaft is connected at each end through the medium of suitable flexible or universal joints so as to allow of relative movement between the shaft carrying the friction wheel and the shaft driven by the engine, whilst the telescopic connection enables the carriage upon which the friction wheel is mounted to be slidden along its guides so as to traverse the friction wheel across the face of the friction disc so as to vary the gear ratio at which the drive is transmitted between them.

The friction wheel may be mounted upon the end of its shaft by means of a suitable helical screw-threaded connection, so that the driving torque transmitted from the shaft to the friction wheel will cause the latter to slide upon the shaft against the action of a spring and so tend to increase the pressure between its surface and the surface of the friction disc in proportion to the driving torque to be transmitted.

Suitable actuating levers or other control mechanism are provided to enable the sliding carriage to be moved along its guides so as to vary the effective gear ratio between the driving wheel and the driven disc. A suitable Bowden wire or other control is provided to enable the bracket carrying the friction wheel to be drawn away from the face of the friction disc against the action of the spring or springs so as to release the pressure between the face of the driving wheel and the driven disc so as to produce a clutching effect, enabling slip to be obtained between the driving wheel and driven disc, or to disengage them wholly so as to obtain a free engine.

In order that my invention may be more readily understood reference is made to the accompanying sheet of illustrative drawings in which:—

Fig. 1 is a side elevation of a convenient construction of my apparatus for transmitting power as applied to a motor-cycle.

Fig. 2 is a plan of same.

Figure 3:
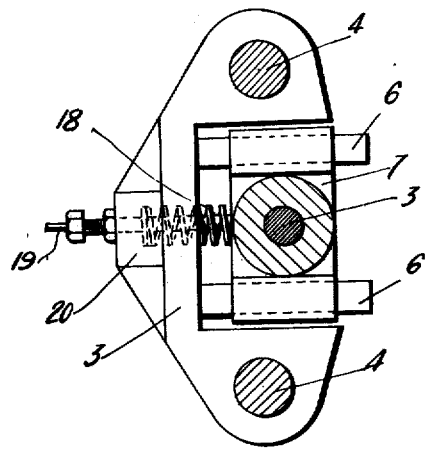
Fig. 3 is an end view of the slidable carriage carrying the friction wheel.

Referring to the drawings the conical friction disc 1 is mounted upon the driven wheel 2 of the motor-cycle concentrically with its axis. A slidable carriage 3 is mounted upon the chain stays 4 of the motor-cycle so that it may be moved longitudinally on these chain stays which form, and are hereinafter referred to as guides, and are arranged parallel to the conical face of the friction disc 1. The slidable carriage 3 is provided with a series of guide pins or rods 6, projecting transversely from its face toward the surface of the driven disc 1 upon the wheel 2 of the motor-cycle. On these guide pins 6 is mounted a bracket 7, in which is journalled a short shaft 8 carrying at one end the conical driving wheel 9, and connected at its other end to the source of power.

The method of connecting the shaft 8 to the source of power is by means of a telescopic shaft arranged in two sections 10 and 11, the former of which is connected by a universal joint 12 to the shaft 8, whilst the latter is connected by a universal joint 13 to a short shaft 14 mounted in bearings 15 upon the crank case of the engine. This short shaft 14 is provided with a bevel wheel 16 which gears with another bevel wheel 17 upon the shaft of the engine so that the short shaft 14 will be driven direct from the engine through bevel wheels 16 and 17, and since this shaft 14 is connected by the telescopic shaft 10 and 11, and universal joints 12 and 13 to the shaft 8, the conical driving wheel 9 mounted upon the end of this shaft will be driven by the engine at a suitable speed. The axis of the shaft 8 carrying the conical driving wheel 9 is arranged substantially upon a line which is radial from the centre of the driven disc 1 so as to maintain a true driving contact between the driving wheel 9 and the disc 1 at any position.

Whilst the guides 4 upon which the carriage 3 slides are arranged parallel to the conical surface of the driven disc 1, the axis of the shaft 8 carrying the driving wheel 9 is arranged substantially at right angles to the axis of the driven disc 1 and the wheel 2 of the motor-cycle. This enables a driving wheel 9 of considerable width to be employed, whilst allowing a true engagement along its whole width to be maintained with the driven disc 1.

The bracket 7, in which the shaft 8 is mounted, may slide upon the lateral guide pins 6, and a coil spring 18 is arranged between the slidable carriage 3 and the bracket 7 so as to tend to force the bracket 7 along its guide pins 6 toward the driven disc 1, thus holding the driving wheel 9 into frictional engagement with the surface of the disc 1.

A suitable connection 19 passes through a boss 20 upon the carriage 3. This is adapted to draw back the bracket 7 against the action of the spring 18 and so relieve the pressure between the driving wheel 9 and the disc 1, or to entirely disengage them so as to provide a free engine.

Figure 4:
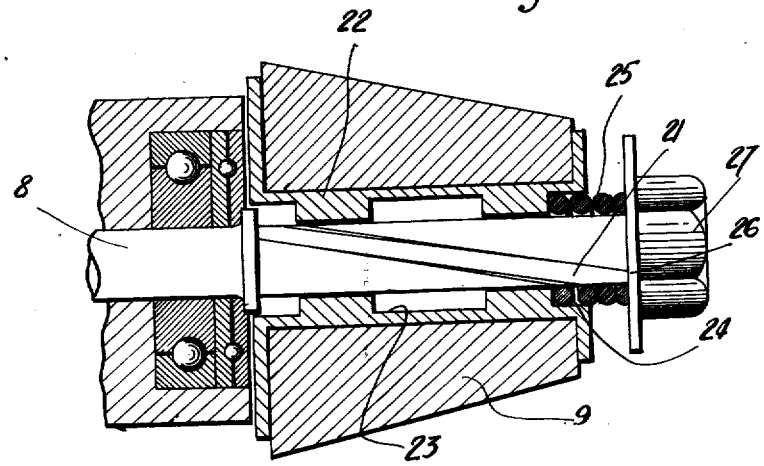
Fig. 4 is a longitudinal section through the driving wheel showing a method of mounting it upon its shaft.

Referring now more particularly to Fig. 4 which shows the method of mounting the driving wheel 9 upon its shaft 8, the outer end of the latter is provided with a helical screw-thread 21 of steep pitch. The conical driving wheel 9 which is built up of suitable material having a high co-efficient of friction, is provided with a metal bush 22 in which is cut a helical screw-thread 23, which corresponds and engages with the screw-thread 21 upon the shaft 8.

In the outer end of the bush 22 is provided a recess 24 in which engages a coil spring 25, the other end of which bears against the washer 26 and nut 27 upon the end of the shaft. This spring 25 will thus tend to force the friction wheel 9 on to its shaft and away from the axis of the driven disc 1. When, however, power is being transmitted, the direction of rotation of the shaft 8 and the angle of the helical screw-thread 21 upon its end are such that the driving wheel 9 will be forced along its shaft 8 against the action of the spring 25 and toward the centre of the driven disc 1.

Owing to the conical nature of this driving wheel 9 and the driven disc 1, this will cause an increase in the effective pressure between the surface of the wheel 9 and the disc 1 so as to increase the friction between them and ensure an effective transmission of the power.

As the power to be transmitted, or the force to be overcome increases, the wheel 9 will be screwed further along its shaft 8 so that the friction between it and the disc 1 will increase in proportion.

I claim:—

1. A driving gear for motor vehicles comprising a vehicle frame having a rigid part, a driven wheel, a conical driven disc connected to said driven wheel, a driving shaft, a conical driving member slidably mounted upon said driving shaft, a carriage adapted to support said driving member slidably mounted upon said rigid part of the vehicle frame whereby the effective gear ratio may be varied, and means for bringing increased pressure upon the driven disc during rotation of said driving shaft, said carriage being provided with means relatively movable therein whereby said driving member may be brought into or out of engagement with the driven disc.

2. A driving gear for motor vehicles, comprising a driven wheel, a conical driven disc connected to said driven wheel, a longitudinally slidable carriage, guide pins carried by said carriage, a bearing slidably mounted upon said guide pins for lateral movement within said carriage, a short shaft carried in said bearing, a conical driving wheel mounted upon said short shaft, spring means interposed between said bearing and carriage whereby the driving wheel is maintained in contact with the driven disc, said bearing being movable upon said guide pins against the action of said spring, whereby the driving wheel may be brought out of contact with the driven disc.

3. A driving gear for motor vehicles, comprising a driven wheel, a conical driven disc connected to said driven wheel, a longitudinally slidable carriage, a bearing laterally movable within said carriage, a short shaft carried in said bearing, a conical driving wheel mounted upon said short shaft, a telescopic shaft connecting said short shaft with the engine, a quick pitch screw thread on said short shaft, a corresponding thread in the interior of the driving wheel with which it engages so that the rotation of the shaft will tend to force the wheel toward the axis of the driven disc, a spring upon the shaft tending to force the wheel in the reverse direction, rigid guides upon which the carriage is supported so that the bearing of said shaft may slide parallel to the conical face of the driven disc, transverse guides upon the slidable carriage upon which the bearing carrying the short shaft is mounted, and at least one spring connected to the slidable carriage and the bracket to force the latter toward the driven disc so as to hold the driving wheel in frictional contact therewith.

GEORGE SIDNEY MEPSTEAD.